(12) United States Patent
Simmons et al.

(10) Patent No.: US 9,016,181 B2
(45) Date of Patent: Apr. 28, 2015

(54) POLYMER CLAY SLICING SYSTEM

(75) Inventors: Carol Lynne Simmons, Fort Collins, CO (US); Craig Allen Brodahl, Bellvue, CO (US)

(73) Assignee: Polymer Clay Solutions, LLC, Fort Collins, CO (US)

( * ) Notice: Subject to any disclaimer, the term of this patent is extended or adjusted under 35 U.S.C. 154(b) by 238 days.

(21) Appl. No.: 13/333,491

(22) Filed: Dec. 21, 2011

(65) Prior Publication Data

US 2012/0160066 A1   Jun. 28, 2012

Related U.S. Application Data

(60) Provisional application No. 61/460,051, filed on Dec. 22, 2010.

(51) Int. Cl.
| | |
|---|---|
| *B26D 1/00* | (2006.01) |
| *B26D 5/08* | (2006.01) |
| *B26D 1/08* | (2006.01) |
| *B26D 5/10* | (2006.01) |
| B23D 15/08 | (2006.01) |
| B26D 5/02 | (2006.01) |

(52) U.S. Cl.
CPC . *B26D 1/08* (2013.01); *B23D 15/08* (2013.01); *B26D 5/02* (2013.01); *B26D 5/10* (2013.01)

(58) Field of Classification Search
USPC ............. 30/607, 605, 932, 356.2, 624, 915.5, 30/606; 83/607, 605, 932, 356.2, 624, 83/915.5, 606, 613, 158, 160, 781, 821, 83/824

See application file for complete search history.

(56) References Cited

U.S. PATENT DOCUMENTS

| | | | | |
|---|---|---|---|---|
| 348,434 | A * | 8/1886 | Wallace | 83/133 |
| 2,580,864 | A * | 1/1952 | Upright | 83/147 |
| 2,617,190 | A * | 11/1952 | Taylor | 83/624 |
| 3,030,842 | A * | 4/1962 | Goltermann | 83/564 |
| 3,868,904 | A * | 3/1975 | Wulf | 101/316 |
| 4,085,642 | A * | 4/1978 | Birmingham | 83/764 |
| 4,246,821 | A * | 1/1981 | Fuse | 83/707 |
| 4,817,581 | A * | 4/1989 | Trentadue | 125/14 |
| 5,172,622 | A * | 12/1992 | Sabin | 83/520 |
| 5,621,972 | A * | 4/1997 | Sala | 30/116 |
| 6,352,013 | B1 * | 3/2002 | Schlattl et al. | 83/522.19 |
| 6,389,943 | B1 * | 5/2002 | Wagner et al. | 83/468.2 |
| 7,721,638 | B2 * | 5/2010 | Verhalen et al. | 83/718 |

OTHER PUBLICATIONS

U.S. Appl. No. 61/460,051, filed Dec. 22, 2010.

* cited by examiner

*Primary Examiner* — Omar Flores Sanchez
(74) *Attorney, Agent, or Firm* — Craig R. Miles; CR Miles P.C.

(57) ABSTRACT

A polymer clay slicer having a base which supports a platform positionally adjustable in relation to a blade carrier which operates to engage a blade with an amount of polymer clay located on the platform to generate polymer clay slices having a desired thickness.

16 Claims, 4 Drawing Sheets

POLYMER CLAY SLICING SYSTEM

This United States Non-Provisional patent application claims the benefit of U.S. Provisional Patent Application No. 61/460,051, filed Dec. 22, 2010, hereby incorporated by reference herein.

I. BACKGROUND

A polymer clay slicer having a base which supports a platform positionally adjustable in relation to a blade carrier which operates to engage a blade with an amount of polymer clay located on the platform to generate polymer clay slices having a desired thickness.

Polymer clays for use by artists can be formulated to provide a pliably moldable or sculptable clay at temperatures of between about 60° Fahrenheit ("F") and about 80° F. and curable at temperatures of between about 250° F. and about 300° F. to produce substantially rigid objects. Typically, polymer clays are formulated from polyvinyl chloride and one or more of several kinds of liquid plasticizer. Pigments or opaquing agent can be added to the translucent materials to create a variety of colors and opacities as desired. Other materials such as mica can be added to simulate pearlescent and metallic effects. The formulations of polymer clay contain no clay minerals and may be referred to as clay because the texture and working properties resemble those of mineral clays.

Certain polymer clay techniques such as mica shift, mokume gane, or the like utilize slices or sheets of clay polymer cut or sliced from blocks of polymer clay prior to curing having a thickness typically in the range of about one-sixty fourth of an inch to about one-quarter inch; however, the invention is not so limited. The thin slices or sheets of polymer clay can for example be laminated or stacked or otherwise disposed in relation to one another to produce blocks of polymer clay which manifest a numerous and wide variety of patterns. These blocks of polymer clay can again be cross sectionally sliced or cut to produce slices or sheets of patterned polymer clay which can be used for a wide variety of projects, such as veneers that can be applied to the surfaces of a wide variety of objects. The blocks of clay useful for producing sheets or slices can manifest a numerous and wide variety of dimensional relations from a fraction of an inch to several inches; however, the invention is not so limited, and can also manifest a numerous and wide variety of geometric forms, for example in cross section, square, rectangle, circular, oval, triangular, pentagonal, or the like.

A conventional method of producing sheets or slices of polymer clay is performed by drawing a blade slidingly coupled to or slided against a pair of horizontal guide members or a pair of vertical guide members. There are a number of substantial problems associated with this conventional method.

Firstly, each of the pair of guide members may be attached to a support surface by one side or by one end but the other side or other end may not attached to any support structure. As a result the guide members can move in response to sliding engagement of the blade.

Secondly, the blade may be assembled in a blade carrier which lacks sufficiently frictionless coupling to the pair of guide members to produce sufficiently smooth travel along the guide members to produce sheets or slices of a desired thickness, thinness or surface smoothness.

Thirdly, blocks of polymer clay of conventional formulation may not adhere to support surfaces. The block of polymer clay may move or slide across the support surface as the blade is drawn through the block.

Fourthly, blocks of polymer clay of conventional formulation may adhere or stick to the blade as it is drawn through the block. Additionally, the friction of drawing the blade too rapidly through the block or using a blade that reciprocates or revolves too rapidly can generate sufficient change in temperature to alter the consistency of the polymer clay at the cutting surface.

Fifthly, it can be difficult to produce uniformly thick slices or sheets of clay by drawing a hand held blade through a block of polymer clay. The larger the block of polymer clay the more difficult it may become to produce consistently uniform slices or sheets. Typically, uniformly thick slices or sheets are limited to or produced from blocks of polymer clay having relatively small dimensional relations of not greater than one inch on a side.

Another substantial problem with conventional clay slicers may be that the platform reciprocally coupled to a base may lack sufficiently frictionless movement to afford repeated fine incremental adjustment between the platform and the base to produce a corresponding serial plurality of clay slices having substantially equal thickness.

Another substantial problem with conventional clay slicers may be that the mechanism that reciprocally drives the platform in relation to the base may not allow both gross and fine incremental reciprocal travel of the platform in relation to the base of pre-determined distance.

Another substantial problem with conventional clay slicers may be that there is no manner of ready assembly and disassembly allowing portability or ease of transport.

The instant invention provides a polymer clay slicing system which overcomes certain of the forgoing disadvantages of conventional methods of slicing polymer clay.

II. SUMMARY OF THE INVENTION

Accordingly, a broad object of the invention can be to provide a polymer clay slicer which can be utilized to produce consistently uniform polymer clay slices and methods of producing polymer clay slices of consistently greater uniformity than slicing polymer clay using a hand drawn blade, even when the external dimensions of the amount of clay sliced preclude the production of consistently uniform slices by hand.

Another substantial object of the invention can be to provide a reciprocating platform configured to receive an amount of polymer clay and incrementally advance the amount of clay in positional relation to a reciprocating blade carrier which can repeatedly engage a cutting edge of a blade with the amount of clay incrementally advanced by the platform to produce a plurality of consistently uniform polymer clay slices.

Another substantial object of the invention can be to provide a reciprocating platform coupled on roller element bearings to a base to reduce interaction between the base and the platform to ease performance of both gross and fine incremental reciprocating adjustment of the platform in relation to the base.

Another substantial object of the invention can be to provide an adherent layer on surfaces of the reciprocating platform and back stop to dispose the amount of clay to be sliced in adherent fixed relation to the reciprocating platform and reciprocating blade carrier to increase uniformity in the polymer clay slices produced.

Another substantial object of the invention can be to provide a pair of guide members joined in rigid fixed relation and blade carrier configured to have reduced resistance in sliding engagement with the pair of guide members.

Another substantial object of the invention can be to provide a blade for the production of polymer clay slices configured to reduce adherence between the amount of clay sliced and the blade, reduce compression of the remaining portion of the amount of clay to be sliced, and direct the polymer clay slices produced away from the remaining portion of the amount of clay.

Another substantial object of the invention can be to provide a kit for assembly of a polymer clay slicer which provides a platform assembly and a blade carrier assembly which can be readily assembled and disassembled.

Naturally, further objects of the invention are disclosed throughout other areas of the specification, drawings, photographs, and claims.

IV. DETAILED DESCRIPTION OF THE PREFERRED EMBODIMENTS

Figure 1:
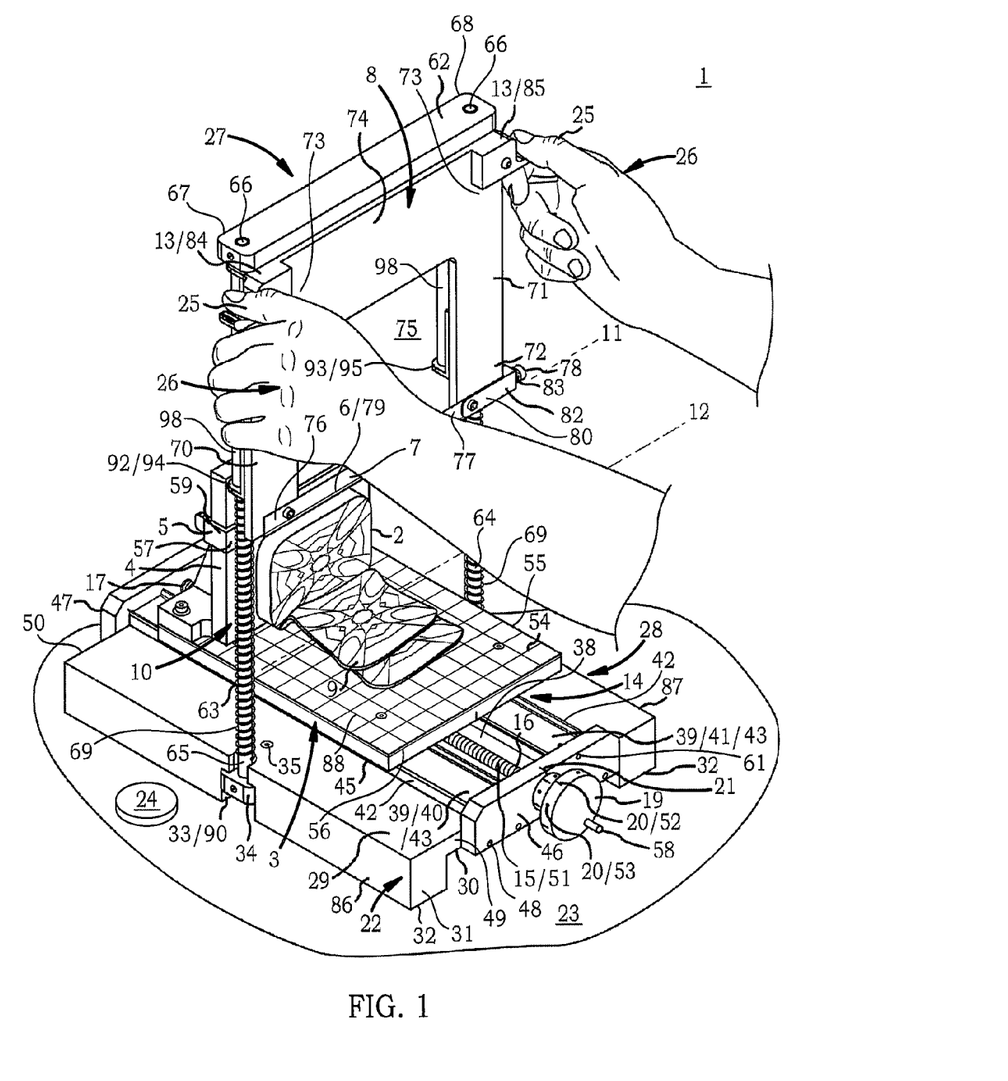
FIG. 1 is a front perspective view of a particular embodiment of the inventive polymer clay slicing system which further illustrates a particular method of slicing polymer clay.
Figure 2:
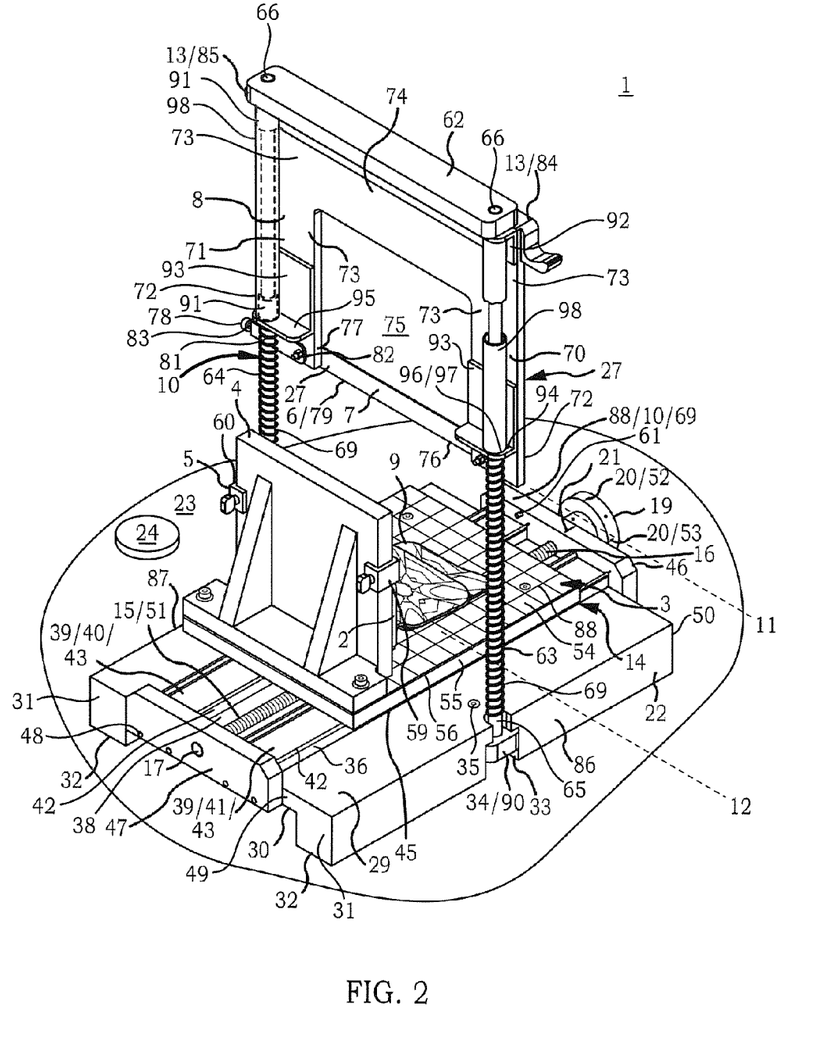
FIG. 2 is a back perspective view of a particular embodiment of the inventive polymer clay slicing system.

Now referring primarily to FIGS. 1 and 2, a particular method of utilizing an inventive polymer clay slicer (1) to slice an amount of polymer clay (2) is illustrated. The polymer clay (2) can be any of a wide and numerous varieties of polymer clay (2), as above described. The amount of polymer clay (2) can be an uncured homogeneous amount of polymer clay (2) or can be an uncured heterogeneous composite of different amounts of polymer clay (2) assembled to provide the amount of clay (2) as a cane, block, or other useful form which can have a wide variety of external dimensional relations and external geometric forms useful in producing polymer clay objects (24).

In regard to certain embodiments of the polymer clay slicer (1), an amount of polymer clay (2) can be located on a platform (3) and can be further located to engage a backstop (4) which functions to stabilize the amount of polymer clay (2) in positional relation to the platform (3). As to certain embodiments, a restraint element (5) can be adjusted in relation to the backstop (4) to engage the amount of polymer clay (2) to substantially fix the amount of polymer clay in positional relation to the backstop (4) and to the platform (3).

The amount of polymer clay (2) located on the platform (3) can be positionally adjusted in relation to the cutting edge (6) of a blade (7) by generating incremental reciprocal travel in the platform (3). The blade (7) by operation of a blade carrier (8) travels in relation to the amount of polymer clay (2) located on the platform (3). Travel of the blade carrier (8) can engage the blade (7) with the amount of polymer clay (2) located on the platform (3) to produce polymer clay slices (9). The polymer clay slices (9) can be removed from the platform (3) for use individually or in combination with other polymer clay slices (9), as above described.

As to certain embodiments of the polymer clay slicer (1), the blade carrier (8) can be slidly coupled in springed relation to a guide frame (10). Travel of the blade carrier (8) from a first blade carrier position (11) toward a second blade carrier position (12) on the guide frame (10) can correspondingly locate the blade (7) in adjacent relation to the platform (3) to cut polymer clay slices (9) from the amount of polymer clay (2) located on the platform (3). Travel of the blade carrier (8) can be generated by forcible urging upon the blade carrier (8) to compress or elongate one or more springs (69). Upon release of forcible urging the energy stored in the springs (69)(or other resiliently flexible member) can be sufficient to return the blade carrier (8) toward the first carrier position (11). Forcible urging upon the blade carrier (8) and incremented travel in the platform (3) can be repeated to produce a plurality of polymer clay slices (9). As to certain embodiments, the force receiving elements (13) can be configured to receive forcible urging in the form of downward pressing engagement of a thumb (25) of each hand (26). As to other embodiment the forcible urging can be by mechanical means coupled to the blade carrier (8) whether or not applied to the force receiving elements. As one example the mechanical means can include a lever pivotally coupled at a first end to the base and coupled medially to the blade carrier (8). Second end of the lever can extend outwardly and force applied proximate the second end again whether mechanically or with the hand (26).

Positional adjustment of the platform (8) in relation to travel of the blade (7) within the blade carrier (8) can be achieved by operation of a platform assembly (14). As to certain embodiments, movement of the platform (8) can be achieved by rotation of a helical screw (15) having each screw end (16)(17) rotationally journaled in fixed relation a distance apart; however, the invention is not so limited as further described below. Rotation of the helical screw (15) acts upon a translation means (18)(see the example of FIG. 3) coupled to the platform (8) which translates rotational motion of the helical screw (15) to linear travel of the platform (8).

Rotational urging of the helical screw (15) can be aided by a rotation means (19) configured to receive rotational urging from the hand (26). The rotation means (19) can for example take the form of a handle, knob, or the like, gripable by the hand (26) to generate rotation of the helical screw (15). As to certain embodiments, alignment of one of a plurality of calibrated indicia (20) coupled to the rotation means (19) with a reference indicia (21) allows movement of the platform (8) in measured increments toward or away from the travel path of the blade (7) which allows production of polymer clay slices (9) of a desired consistent thickness.

Now referring primarily to FIGS. 3-6, which illustrates the component parts of a particular embodiment of the polymer clay slicer (1) which generally includes a blade carrier assembly (27), a platform assembly (14), and a base assembly (28).

The base assembly (28) provides a base (22) having a first external surface (29) disposed in generally opposed relation to a second external surface (30). The first external surface (29) can be configured as a generally planar surface to receive the platform assembly (14); however, the invention is not so limited and the first external surface (29) can be configured in any manner which can receive and allows operation of the platform assembly (14). As one non-limiting example shown in FIG. 3, the first external surface (29) can further include a pair of riser elements (36)(37) which function to elevate the platform assembly (14) a height above the generally planar surface of the base (22) to provide between a passage (38) within which the helical screw (15) and translation means (18) of the platform assembly (14) can be operably located.

Figure 3:
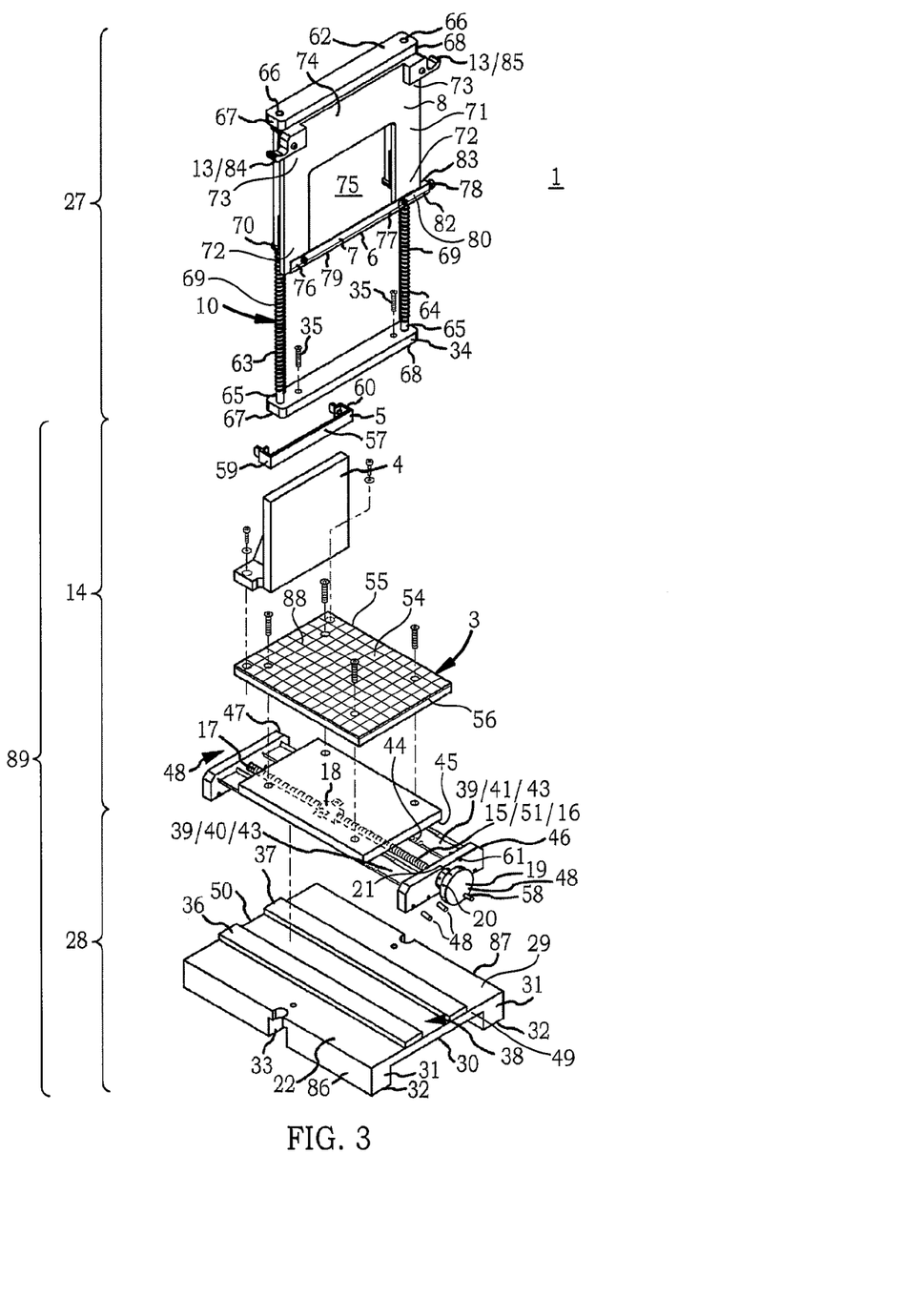
FIG. 3 is an exploded view of the particular embodiment of the polymer clay slicing system shown in FIG. 1.
Figure 4:
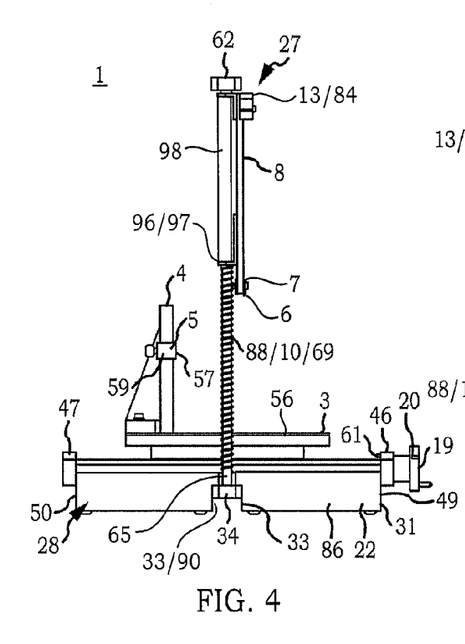
FIG. 4 is a side view of the particular embodiment of the polymer clay slicing system shown in FIG. 1.
Figure 5:
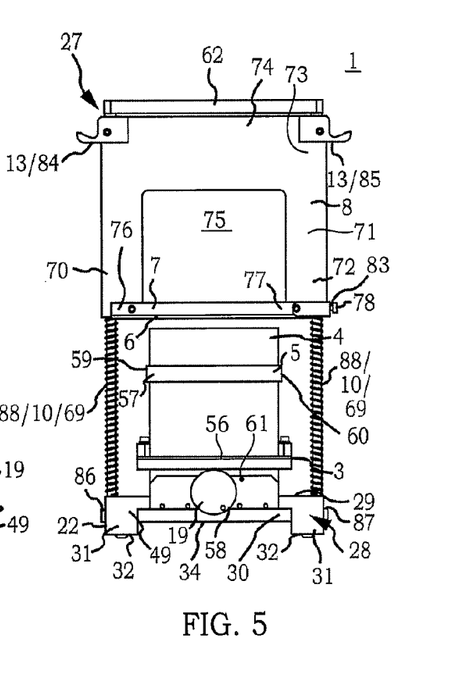
FIG. 5 is a front view of the particular embodiment of the polymer clay slicing system shown in FIG. 1.
Figure 6:
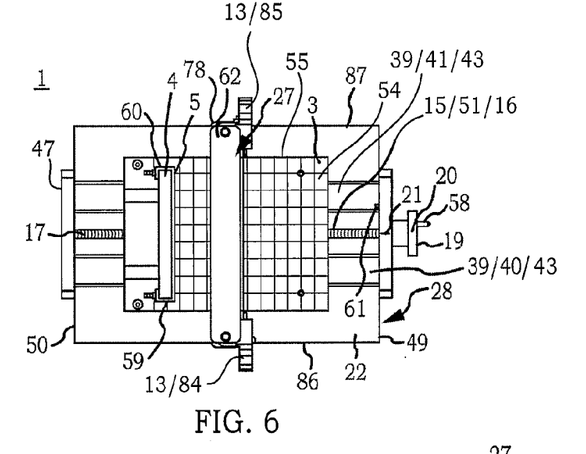
FIG. 6 is a plan view of the particular embodiment of the polymer clay slicing system shown in FIG. 1.

As a second non-limiting example, the passage (38) can take the form of a channel cut a depth into the first external surface (29) of the base (22).

As shown in FIG. 3, the second external surface (30) can be configured to provide a substantially planar surface to which one or more leg elements (31) project downwardly to provide a terminal end (32) configured to engage the support surface (23). The leg elements (31) as shown in FIG. 3 comprise a pair of elongate members substantially square or rectangular in cross section coupled to the second external surface (30) proximate the opposed sides (86)(87) of the base (22); however, the invention is not so limited and the leg elements (31) can be configured in any manner suitable for supporting the base (22) in relation to the support surface (23). The second external surface (30) can be further configured for removable attachment of the blade carrier assembly (27). As shown in FIG. 3, each of the pair of leg elements (31) configured as elongate members can further include a recess element (33) which removably receives a first cross member (34) of the blade carrier assembly (27). The first cross member (34) of the blade carrier assembly (27) can be attached in fixed relation to the second external surface (30) of the base (22) by one or more mechanical fasteners (35) which can couple to the base (22) by mated spiral threads, snap fit, compression fit, or the like.

While the geometry of the base (22) as shown in the Figures is generally a square or rectangular volume; the invention is not so limited, and the base (22) can be any one of a numerous and varied external geometries such as circular, oval, or other polygonal forms depending on the application.

Again referring primarily to FIGS. 3-6, the platform assembly (14) can comprise a platform (3) slidably mounted for reciprocal movement on one or more guide elements (39). Typically, when the leg elements (31) of the base assembly (28) are engaged with a support surface (23) the platform (3) provides substantially linear horizontal reciprocal movement on the guide elements (39). The guide elements (39) as to certain embodiments can take the form of mated surfaces configured to slidably engage without substantial lateral (side-to-side), rotational, or vertical (up and down) movement (such as mated dove tails, or the like). As to the embodiment shown in the Figures, the guide elements (39) take the form of a pair of slide assemblies (40)(41) each having a first slide member (42) correspondingly fastened to each of the pair of riser elements (36)(37) so as to be disposed in secured parallel relation and spaced a distance apart. A second slide member (43) can be slidly engaged on roller element bearings (44) to the first slide member (42) and secured to the bottom surface (45) of the platform (3). The pair of slide assemblies (40)(41) having the first and second slide members (42)(43) correspondingly secured to the riser elements (36)(37) of the base (22) and the bottom surface (45) of the platform (3) can provide substantially horizontal reciprocal linear movement of the platform (3) on the pair of guide elements (39) without substantial lateral, rotational or vertical movement of the platform (3). As one non-limiting example, the guide elements can be provided as under mount glides Part No. KV1129 ZC 16 available from Knape & Vogt; however, the invention is not so limited.

As one non-limiting example, horizontal reciprocating movement of the platform (3) on the guide elements (39) can be achieved by a single elongate helical screw (15) having a length disposed between a pair of screw ends (16)(17) each correspondingly journaled to one of a pair of end plates (46)(47) disposed in opposed relation at either end of the helical screw (15) which can be attached by mechanical fasteners (48) to a pair of opposed ends (49)(50) of the base (22) to locate the helical screw (15) medially between the pair of riser elements (36)(37) (or the passage (38)) of the base (22). The helical screw (15) can be rotationally engaged within the translation means (18) held in fixed relation to the bottom surface (45) of the platform (3). Rotation of the helical screw (15) within the translation means (18) drives the translation means (18) toward a corresponding screw end (16)(17). The rotational engagement between the helical screw (15) and the translation means (18) can be configured to avoid any substantial end-play (the amount of rotation in the helical screw before travel in the platform occurs). The helical screw (15) can have any of a numerous and wide variety of pitches (51). As a non-limiting example, the helical screw (15) can have a one sixty fourth inch pitch, that is one sixty fourth inch of travel per revolution of the helical screw (15) (or 64 helical threads per inch). Typically, the pitch (51) can be selected such that each rotation of the helical screw yields an amount of travel in the platform (3) which corresponds to a commonly utilized fraction of an inch or meter such as $\frac{1}{64}$ of an inch (64 threads per inch), $\frac{1}{32}$ of an inch (32 threads per inch), $\frac{1}{16}$ of an inch (16 threads per inch), $\frac{1}{4}$ of an inch (4 threads per inch) or 0.25 millimeter (four threads per millimeter) one millimeter (one thread per millimeter), or the like.

A rotation means (19) can be coupled to one or both screw end(s) (16)(17) to assist in rotation of the helical screw (15) by gripable engagement of the hand (26). As shown in FIG. 3, an embodiment of the rotation means (19) can have a generally cylindrical configuration; however, the invention is not so limited and the rotation means (19) can take any form gripable by the hand (26) to generate rotation in the helical screw (15). The rotation means (19) can further include a gripable protrusion (58) outwardly extending from the face of the rotation means (19) which can be forcibly urged to travel in a circular motion to expedite rotation of the helical screw (15). The gripable protrusion (58)(which could also be in the form of an indentation adapted to engage a finger) can be removable as to certain embodiments.

The external surface of the cylindrical rotation means (19) can further include at least one or a plurality of calibrated indicia (20) each of which can be rotatably aligned with a reference indicia (21) typically coupled in fixed relation to a corresponding one of the end plates (46)(47). By rotation of the rotation means (19) from alignment of a first calibrated indicia (52) to alignment of a second calibrated indicia (53) a known amount of travel can be generated in the platform (3); however, the invention is not so limited, and as to certain embodiments the reference indicia (21) can be coupled to the rotation means (19) and the calibrated indicia (20) can be coupled to the corresponding end plate (46) or (47). For example, a helical screw (15) having 32 threads per inch (one rotation generating $\frac{1}{32}$ of an inch of travel in the platform (3)) allows indication of $\frac{1}{64}$ of an inch of travel in the platform (3) by providing a pair of calibration indicia (20) the first coupled to the rotation means (19) at zero degrees in relation to the reference indicia (21) on the end plate (46) and the second coupled to the rotation means at 180 degrees in relation to the reference indicia (21) on the end plate (46). Turning the rotation means (19) to align the second calibrated indicia (53) with the reference indicia (21) can generate $\frac{1}{64}$ inch of travel in the platform (3) assuming the pitch (51) of the helical screw (15) has 32 treads per inch. Similarly, a plurality of calibrated indicia (20) can be coupled to the rotation means (19)(or alternately an end plate (46) or (47)) alignable with the reference indicia (21) to indicate an incremental displacement of the platform (3) in relation to a part or a whole revolution of the helical screw (15). The calibrated indicia (20) and the reference indicia (21) can be marked on the corresponding surfaces of the rotation means (19) and the end plates (46)(47) by etching, imprinting, engraving, stamping, or the like.

Now referring primarily to FIGS. 1, and 3-6, the platform (3)(whether as one layer or more than one layer, for example two layers as shown in FIG. 3) secured to the guide elements (39) and coupled to the helical screw (15) by way of the translation means (18) can have a thickness disposed between a generally planar bottom surface (45) and a generally planar top surface (54) which typically defines a square or rectangular perimeter (55); however, the invention is not so limited and the platform can have a perimeter which defines any manner of geometry desirable for a particular application. The platform (3) can be produced from any of a wide variety of materials such as metal, plastic, wood, glass, or the like; however, there can be an advantage to utilizing a material having sufficient transparency to view the bottom surface (45) through the top surface (54) in that an alignment indicia (88)(as one non-limiting example, a grid pattern) can be coupled to the bottom surface (45)(or between layers of the platform (3)) by imprinting, etching, engraving, or the like useful in aligning the amount of polymer clay (2) on the top surface of the platform (3). While the alignment indicia (88) can be coupled to the top surface (54), the disadvantages of having the alignment indicia (88) coupled to the top surface can include being abraded, filled with polymer clay (2) or transmitting impressions to the amount of polymer clay (2).

The platform (3) can further provide an adherent layer (56) whether integral or coupled to the top surface (54) which functions to resist movement of the amount of polymer clay (2) located on the top surface (54) of the platform (3). Interestingly, polymer clay (2) may not adhere but may de-adhere, detach, slide or have less resistance to sliding on the surface of certain materials such as wood, polyethylene terephthalate ("PETG"), ultra-high-molecular-weight polyethylene ("UHMWPE"), high density polyethylene ("HDPE") and fluoropolymer plastics as well as on most textured surfaces such as orange peel and pebble-grain, and even on smooth but dull surfaces. Only certain materials coupled or integral (one piece) to the top surface (54) of the platform (3) can act as an adherent layer (56) to sufficiently fix the location of the amount of polymer clay (2) on the platform (3) for removal of polymer clay slices (9). A suitable adherent layer (56) can be achieved by the use of acetal plastic, polvinylchloride ("PVC"), acrylonitrile-butadiene styrene terpolymer ("ABS"), polycarbonate plastic, acrylic plastic, polished stainless steel and glass-enameled metal. Acrylic plastic having a polished surface can provide a suitable adherent layer (56) and sufficient transparency for viewing of the alignment indicia (88) on the bottom surface (45).

The platform assembly (14) can further include a back stop (4) fixedly or adjustably coupled to the top surface (54) of the platform (3). Typically, the back stop (4) will be fixedly coupled in substantially perpendicular relation to the top surface (54) of the platform (3); however, the invention is not so limited. The dimensional relations of the back stop (4) can vary depending on the application. Typically, the width of the back stop (4) will not exceed the width of the platform (3), nor have a configuration which engages the blade (12) traveling toward the second position (12) while cutting polymer clay slices (9), nor have a height in excess of the elevation of the cutting edge (6) of the blade (7) in the first blade carrier position (12) allowing the back stop (4) to pass under the cutting edge (6) of the blade (7). Alternately, an adjustable platform stop element (61) extending inwardly from an end plate (46)(47) can be located to engage the platform (3) to prevent the back stop (4) from engaging the blade (7). The back stop (4) can further include the same or a different adherent layer (56) as utilized on the platform (3), as above described. As to certain embodiments, a restraint element (5) can be coupled to the back stop (4). The restraint element (5) can further include a restraint member (57) height adjustable in relation to the top surface (54) of the platform (3). Each end of the restraint member (57) can be coupled separately to the back stop (4) to allow each of a pair of restraint member ends (59)(60) to be independently adjusted in relation to the top surface (54) of the platform (3) to allow the restraint member (57) to be disposed in substantially parallel relation to the top surface (54) or at an angle in relation to the top surface (54). The dimensions of the restraint member (57) can be sufficient to engage the amount of polymer clay (2) having a location against the back stop (4) to substantially fix the position of the amount of polymer clay (2) in relation to the backstop (4) or the platform (3), or both.

Again referring primarily to FIGS. 2-6, the blade carrier assembly (27) can include a guide frame (10). The guide frame (10) can include a pair of guide shafts (63)(64) each having a length disposed between a first shaft end (65) and a second shaft end (66). A first shaft end (65) correspondingly couples proximate the first member end (67) and the second member end (68) of the first cross member (34). A second shaft end (66) correspondingly couples proximate the first member end (67) and second member end (68) of the second cross member (62). The guide frame disposes the pair of guide shafts (63)(64) in substantially parallel relation a distance apart and the first cross member (34) and the second cross member (62) in substantially parallel opposed relation a distance apart.

The blade carrier (8) can be reciprocally slidly coupled to the pair of guide shafts (63)(64) of the guide frame (10). The blade carrier (8) reciprocally travels from a first blade carrier position (11) toward a second blade carrier position (12) on the guide frame (10)(as shown in the example of FIG. 1). The blade carrier (8) can engage a resiliently flexible member (69) which resists travel of the blade carrier (8) toward the second blade carrier position (12)(as shown in FIG. 1). As to certain embodiments, the resilient flexible member (69) can comprise a coil spring (69) surrounding or wound about each guide shaft (63)(64) which compresses as the blade carrier (8) travels toward the second blade carrier position (12); however, the invention is not so limited and the resilient flexible member (69) can for example be a coil spring (69) wound about each guide shaft (63)(64) extended rather than compressed by travel of the carrier guide (8) toward the second blade carrier position (12), or the like. Resistance to travel of the blade carrier (8) toward the second blade carrier position (12) can be sufficient to return the blade carrier (8) to the first blade carrier position (11) upon release of forcible urging toward the second blade carrier position (12).

Certain embodiments of the blade carrier (8) can further include force receiving elements (13) configured to be engaged by the hand (26) to provide forcible urging of the blade carrier (8) sufficient to overcome the resistance of the resilient flexible member (69). Certain of the force receiving elements (13) can take the form of a pair of projections (84)(85) disposed in opposed outwardly extending relation from the blade carrier (8). Each of the pair of projections (84)(85) can be configured to receive downward pressing engagement of a thumb (25).

The blade carrier (8) can be configured to provide a pair of slide members (70)(71) each slidably coupled to a corresponding guide shaft (63)(64). Each of the pair of slide members (70)(71) can have a length disposed between a first slide member end (72) and a second slide member end (73). A cross piece (74) couples proximate each second slide member end (73) to rigidly fix the first slide member ends (73) a distance apart. The pair of slide members (70)(71) and the cross piece (74) in rigid fixed relation define an open space (75).

As to particular embodiments, each of the pair of slide members (70)(71) can be slidably coupled to a corresponding guide shaft (63)(64) by a corresponding pair of linear slide elements (91). Each linear slide element (91) can be configured to provide an internal surface configured to slide over the corresponding guide shaft (63)(64) with an internal surface configured to engage a substantially lesser area of the guide shaft (63))(shown in the example of FIG. 2 as a tubular bearing), as compared to a bore which communicates through the entire height of blade carrier (8), thereby reducing resistance to travel of the blade carrier (8) between the first blade carrier position (11) and the second blade carrier position (12). Each of the linear slide elements (91) can be produced from a material have a lesser coefficient of friction than that of the blade carrier (8) itself.

Now referring primarily to FIG. 2, a particular embodiment of the blade carrier (8) can provide a pair of flange elements (92)(93) coupled to each of the pair of slide members (70)(71) proximate corresponding first and second slide member ends (72)(73) to provide a pair of projecting flanges (94)(95) disposed a distance apart. Each of the pair of projecting flanges (94)(95) has a corresponding aperture element (96)(97) co-axially aligned with the corresponding one of the pair of guide shafts (63)(64) and each projecting flange (94)(95 retains one of the pair of linear slide elements (91) in substantially coaxial alignment with the corresponding aperture elements (96)(97).

As to particular embodiments a cover (98) can be disposed between the pair of projecting flanges (92)(93) with each of the pair of linear slide elements (91) disposed within the cover (98) at proximate opposed ends. As shown by the example of FIG. 2, the cover (98) has a tubular configuration substantially circular in perpendicular cross section to the longitudinal axis. The cover (98) encloses the guide shaft (63)(64) between the pair of projecting flanges (94)(95). Embodiments which include a cover (98) can provide the advantage of an additional surface on which force can be applied with the hand (26) to generate travel in the blade carrier (8) from the first blade carrier position (11) to the second blade carrier position (12).

The blade (7) can have a length disposed between a pair of blade ends (76)(77) each of which correspondingly couple proximate a first slide member end (72) to span the open space (75). One of the pair of blade ends (76) can be coupled in fixed relation proximate the corresponding first slide member end (72). The second of the pair of blade ends (77) can be adjustably coupled in relation to the corresponding first slide member end (72) by a blade tensioner (78). The blade tensioner (78) operates to generate sufficient tension in the blade (7) between the pair of slide members (70)(71) to cut polymer clay slices (9) from the amount of clay (2) located on the platform (3), as above described. A particular non-limiting embodiment of the blade tensioner (78) as shown in the Figures can include a channel element (82) having a pair of legs (80)(81). The channel element (82) can be slidably engaged about one of the slide members (70)(71) proximate the first slide member end (72). One of the legs (80)(81) can be fixedly coupled to the second of the pair of blade ends (77). A spirally threaded member (83) can be rotatingly engaged with a corresponding spiral thread of the channel element (82) to allow the spirally threaded member (83) to engage the surface of the slide member (70)(71). Rotation of the spirally threaded member (83) can generate travel in the channel element (82) away from the surface of the slide member (70)(71) generating increased tension in the blade (7).

The cutting edge (6) of the blade (7) can be configured to provide a bevel (79) on the face of the blade (7) facing away from the surface of the amount of polymer clay (2) from which polymer clay slices (9) are cut. The bevel (79) can thereby direct polymer clay slices (9) away from the amount polymer clay (2) located on the platform (see FIG. 1). The bevel (79) can have an angle of between about 10 degrees to about 15 degrees, or between about 11 degrees to about 14 degrees, or between about 12 degrees and about 14 degrees, or any particular numerical increment within the range depending upon the application. The non-beveled face of the blade (7) can act to reduce the amount of friction between the blade (7) and the amount of polymer clay (2) being cut and avoids compression of the remaining amount of clay (2) and reduces adhesion of the amount of clay (2) to the blade (7). Additionally, the thickness of the blade (7) and the tension of the blade (7) can be adjusted to reduce adherence of the amount of clay (2) to the blade (7). Blades (7) incrementally reduced in thickness can become increasing adherent to the amount of clay (2). Similarly, blades (7) incrementally reduced in tension can become increasing adherent to the amount of clay (2). Additionally, inadequate tension on the blade (7) can result in curvature to the face of the polymer clay slices (9).

Particular embodiments of the invention can be provided in the form of a kit for assembling a polymer clay slicer (1). Now referring to FIGS. 1-6, the kit can provide a polymer clay slicer (1), as above described, as two assemblies. A platform-base assembly (89) and a blade carrier assembly (27) (as shown in the example of FIG. 3) can each have a configuration which allows removable mated engagement to position the blade carrier assembly (27) in relation to the platform-base assembly (89) to position the cutting edge (6) of the blade (7) in substantially opposed parallel relation to the top surface (54) of the platform (3), thereby completing assembly of said polymer clay slicer (1). The blade carrier assembly (27) coupled to the platform-base assembly (89) locates the pair of guide shafts (63)(64) on either side of the path of reciprocal travel of the platform (3) and to locate the reciprocal travel path of the blade (7) in substantially perpendicular relation to the top surface (54) of the platform (3)(although certain embodiments can provide an angular relation to the top surface for certain applications by pivotally coupling the first cross member (34) to the base (22)). Thereby the platform (3) can reciprocally travel medially between the guide shafts (63)(64). The blade (7) can be assembled to the blade carrier (8) to position the cutting edge (6) in substantially parallel opposed relation to the top surface (54) of the platform (3). The kit allows the polymer clay slicer (1) to be disassembled, transported and reassembled for use on a remote support surface (23).

As shown in FIG. 3, the base (22) can be configured to removably receive the first cross member (34) of the blade carrier assembly (27) in a cross member receiving element (90) (such as the recess element (33) above described). The first cross member (34) of the blade carrier assembly (27) received within the cross member receiving element (90) can be attached in fixed relation to the second external surface (30) of the base (22) by one or more mechanical fasteners (35) which can couple the first cross member (34) to the base (22) by mated spiral threads, snap fit, compression fit, or the like.

As can be easily understood from the foregoing, the basic concepts of the present invention may be embodied in a variety of ways. The invention involves numerous and varied embodiments of a polymer clay slicer and methods of using the polymer clay slicer including the best mode of the invention.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "clay slicer" should be understood to encompass disclosure of the act of "slicing clay"—whether explicitly discussed or not—and, conversely, were there effectively disclosure of the act of "slicing clay", such a disclosure should be understood to encompass disclosure of "a clay slicer" and even a "means for slicing clay." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a clay retainer" refers to one or more of those clay retainers. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus, the applicant(s) should be understood to claim at least: i) each of the clay slicing devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A polymer clay slicer, comprising:
 a) a base;
 b) a platform reciprocally slidably coupled to said base, said platform having a top adapted to receive an amount of polymer clay;
 c) a pair of guide members disposed in upright fixed relation to said base, said platform configured to reciprocally travel between said pair of guide members;
 d) a blade carrier including a cross member having a pair of slide members correspondingly coupled to opposed ends of said cross member, each of said pair of slide members reciprocally slidably coupled to a corresponding one of said pair of guide members by a pair of tubular bearings disposed a distance apart on each of said pair of slide members, each of said pair of tubular bearings disposed proximate opposed ends of a tubular cover surrounding a corresponding one of said pair of guide members; and e) a blade having a pair of blade ends, said pair of slide members of said blade carrier to dispose a cutting edge in substantially parallel opposed relation to said top of said platform.

2. The polymer clay slicer of claim 1, further comprising at least one slide assembly having a pair of slide members, a first of said pair of slide members fixedly coupled to said base, a second of said pair of slide members fixedly coupled to a bottom side of said platform, said second of said pair of slide members slidably engaged on roller element bearings to said first of said pair of slide members.

3. The polymer clay slicer of claim 1, further comprising an adherent layer coupled to said top of said platform, said amount of polymer clay positioned on said adherent layer to resist movement in relation to said top side of said platform.

4. The polymer clay slicer of claim 3, wherein said adherent layer is selected from the group consisting of acetal plastic, polyvinylchloride, acrylonitrile-butadiene styrene terpolymer, polycarbonate plastic, acrylic plastic, polished stainless steel and glass-enameled metal, or combinations thereof.

5. The polymer clay slicer of claim 1, further comprising an alignment indicia coupled to said top of said platform, said alignment indicia configured to allow alignment of said amount of polymer clay on said top surface of said platform in relation to said cutting edge of said blade.

6. The polymer clay slicer of claim 1, further comprising a back stop extending upwardly from said top proximate a back side of said platform to provide front face adapted to engage said amount of polymer clay, said back stop having dimensional relations which allow said backstop to reciprocally travel between said pair of guide members and under said cutting edge of said blade in said first position.

7. The polymer clay slicer of claim 6, wherein said adherent layer further couples to said front face of said back stop.

8. The polymer clay slicer of claim 7, further comprising a restraint element coupled to said back stop in height adjustable relation to said top of said platform, said restraint element having dimensional relations adapted to engage said amount of polymer clay engaged with said front face of said back stop.

9. The polymer clay slicer of claim 1, wherein said pair of guide members each have a length disposed between a guide member first end and a guide member second end and further comprising a first cross member and a second cross member each having a length disposed between a cross member first end and a cross member second end, said guide member first ends coupled proximate said cross member first end and said cross member second end of said first cross member and said guide member second ends coupled proximate said cross member first end and said cross member second end of said second cross member to provide a guide frame, said guide frame releasably mountable to said base by said second cross member.

10. The polymer clay slicer of claim 9, further comprising a resiliently flexible member responsive to said blade carrier to resist travel toward said second position to return said blade carrier toward said first position.

11. The polymer clay slicer of claim 10, wherein said resiliently flexible member comprises a coil spring wound about at least one of said pair of guide members.

12. The polymer clay slicer of claim 11, further comprising a pair of force receiving elements coupled in outwardly extending opposed relation to said blade carrier, each of said pair force receiving elements configured to engage part of a hand.

13. The polymer clay slicer of claim 1, further comprising a blade tensioner coupled to one of said pair of blade ends, said blade tensioner including an open sided channel having a bottom wall and a pair of opposed side walls said open sided channel engaged about a side of one of said slide members to allow one of said pair of side walls to couple to one of said pair of blade ends, and further comprising a treaded member rotatable engaged in a threaded bore in said bottom wall of said open sided channel, said threaded member having an end engaged with said slide member whereby rotation of said threaded member generates movement in said open sided channel to adjust tension on said blade.

14. The polymer clay slicer of claim 2, further comprising:
a) an elongate helical screw having a length disposed between a pair of screw ends each rotationally journaled at a front end and rear end of said base to locate said elongate helical screw medially said pair of slide members; and
b) a translation means coupled in fixed relation to said bottom side of said platform, said elongate helical screw rotationally engaged within said translation means, whereby rotation of said elongate helical screw drives said translation means toward a corresponding one of said pair of screw ends.

15. The polymer clay slicer of claim 14, further comprising rotation means coupled to one of said pair of screw ends, wherein said rotation means includes a first rotation element having a generally circular perimeter grippable by a hand, and further comprising a second rotation element outwardly extending from said first rotation element from a location proximate said circular perimeter, said second rotation element grippable by said hand to rotate said rotation means.

16. The polymer clay slicer of claim 15, further comprising a reference indicia coupled in fixed relation to said base and a plurality of calibration indicia coupled to said rotation means, at least one of said calibration indicia alignable with said reference indicia by rotation of said rotation means.

* * * * *